United States Patent
Wang et al.

(10) Patent No.: US 12,533,412 B2
(45) Date of Patent: Jan. 27, 2026

(54) ULTRASOUND-RESPONSIVE LIPOSOME NANOPARTICLES AND PREPARATION METHOD AND USE THEREOF

(71) Applicant: Nanjing University of Posts and Telecommunications, Jiangsu (CN)

(72) Inventors: Lianhui Wang, Jiangsu (CN); Lihui Yuwen, Jiangsu (CN); Weijun Xiu, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 229 days.

(21) Appl. No.: 18/570,072

(22) PCT Filed: Oct. 13, 2022

(86) PCT No.: PCT/CN2022/125025
§ 371 (c)(1),
(2) Date: Dec. 14, 2023

(87) PCT Pub. No.: WO2024/045275
PCT Pub. Date: Mar. 7, 2024

(65) Prior Publication Data
US 2025/0099589 A1    Mar. 27, 2025

(30) Foreign Application Priority Data

Sep. 1, 2022  (CN) .................. 202211066165.X

(51) Int. Cl.
| | | |
|---|---|---|
| *A61K 41/00* | (2020.01) | |
| *A61K 9/1271* | (2025.01) | |
| *A61K 9/1277* | (2025.01) | |
| *A61K 9/51* | (2006.01) | |
| *A61K 31/4164* | (2006.01) | |
| *A61P 31/04* | (2006.01) | |

(52) U.S. Cl.
CPC ........ *A61K 41/0028* (2013.01); *A61K 9/1271* (2013.01); *A61K 9/1277* (2013.01); *A61K 9/5123* (2013.01); *A61K 9/5192* (2013.01); *A61K 31/4164* (2013.01); *A61P 31/04* (2018.01)

(58) Field of Classification Search
None
See application file for complete search history.

(56) References Cited

U.S. PATENT DOCUMENTS

| | | | |
|---|---|---|---|
| 8,765,172 B2 * | 7/2014 | Lauten | A61P 35/00 424/450 |
| 8,906,409 B2 * | 12/2014 | Lauten | A61K 9/1271 977/773 |
| 9,034,374 B2 * | 5/2015 | Lauten | A61K 9/0019 424/451 |
| 2009/0098212 A1 * | 4/2009 | Fossheim | A61K 9/1271 424/502 |
| 2020/0330598 A1 | 10/2020 | Nomikou | |
| 2022/0233713 A1 | 7/2022 | Callan et al. | |

FOREIGN PATENT DOCUMENTS

| | | |
|---|---|---|
| CN | 108619096 | 10/2018 |
| CN | 108853520 | 11/2018 |
| CN | 111671923 | 9/2020 |
| CN | 113599520 | 11/2021 |
| CN | 114377146 | 4/2022 |
| CN | 114558133 | 5/2022 |
| WO | 2008157422 | 12/2008 |

OTHER PUBLICATIONS

Ma et al, J. Acoust. Soc. Am. (2016), 140(6), pp. EL534-EL538.*
Nakonechny et al., Adv. Funct. Mater. (2021), 31, 24 pages.*
"International Search Report (Form PCT/ISA/210) of PCT/CN2022/125025", mailed on Jan. 3, 2023, with English translation thereof, pp. 1-5.
"Written Opinion of the International Searching Authority (Form PCT/ISA/237) of PCT/CN2022/125025", mailed on Jan. 3, 2023, pp. 1-5.

* cited by examiner

Primary Examiner — Brian J Davis
(74) Attorney, Agent, or Firm — JCIPRNET

(57) ABSTRACT

The present invention provides ultrasound-responsive liposome nanoparticles and a preparation method and use thereof. The liposome nanoparticles include dimyristoylphosphatidylcholine, 1,2-dioleoyl-3-trimethyl ammonium-propane, distearoylphosphatidylethanolamine-polyethylene glycol, a sonosensitizer, an antibiotic, and perfluoropentane. The liposome nanoparticles are used for the treatment of bacterial biofilm infections. The preparation method involves preparing a liposome film.

13 Claims, 5 Drawing Sheets

ULTRASOUND-RESPONSIVE LIPOSOME NANOPARTICLES AND PREPARATION METHOD AND USE THEREOF

CROSS-REFERENCE TO RELATED APPLICATION

This application is a 371 of international application of PCT application serial no. PCT/CN2022/125025, filed on Oct. 13, 2022, which claims the priority benefit of China application no. 202211066165.X. filed on Sep. 1, 2022. The entirety of each of the above mentioned patent applications is hereby incorporated by reference herein and made a part of this specification.

TECHNICAL FIELD

The present invention belongs to the field of biological preparations against bacterial biofilms, and in particular, relates to an ultrasound-responsive liposome and a preparation method and use thereof.

BACKGROUND

A biofilm is a highly organized and systematic multicellular community composed of bacteria and other microorganisms that secrete extracellular polymeric substances (EPS) to wrap themselves during the growth process. Due to the coating of EPS, it is difficult for most drug molecules to permeate into the biofilm and interact with the internal bacteria, thus hindering the inhibitory effect of antibacterial agents on the bacteria inside the biofilm. In addition, EPS plays a certain role in impeding the diffusion of external oxygen, causing the oxygen content in the biofilm to gradually decrease from outside to inside. Bacteria in the outer layer of the biofilm have high metabolic activity and are sensitive to antibacterial drugs, while bacteria inside the biofilm have low metabolic activity and are highly resistant to antibacterial drugs. Therefore, the special fortress structure of the biofilm and the metabolic heterogeneity of the internal bacteria make it difficult for traditional drug treatments to completely eliminate the bacteria inside the biofilm and lead to stubborn chronic infections.

The development of nanotechnology has brought a new dawn to the treatment of bacterial biofilm infections. In the laboratory research stage, many nano-reagents have been developed to disrupt biofilm structures and enhance the permeation of antibiotics inside the biofilm to achieve better bactericidal effects. However, although current treatment modes based on nano-reagents to enhance bio-permeation can kill bacteria with high metabolic activity in the outer layer of the biofilm, they have a limited therapeutic effect on bacteria with low metabolic activity deep in the biofilm and can easily cause recurrence of the biofilm. Therefore, the key to eliminating the biofilm and addressing the recurrence of biofilm infections is to effectively kill the bacteria with metabolic heterogeneity inside the biofilm, in addition to enhancing the drug permeation.

SUMMARY

In view of the above problems, the present invention provides an ultrasound-responsive liposome, which contains a sonosensitizer and an antibiotic to form liposome particles. Under the action of ultrasound, the liposome particles can produce a cavitation effect to destroy the bacterial biofilm structure, enhance drug permeation, and achieve potent anti-biofilm performance.

To achieve the above purpose, the present invention is implemented by the following technical solution:

The present invention provides ultrasound-responsive liposome nanoparticles. The liposome nanoparticles include dimyristoylphosphatidylcholine (DMPC), 1,2-dioleoyl-3-trimethyl ammonium-propane (DOTAP), distearoylphosphatidylethanolamine-polyethylene glycol (DSPE-PEG), a sonosensitizer, an antibiotic, and perfluoropentane (PFP).

The present invention also provides a method for preparing ultrasound-responsive liposome nanoparticles, comprising the following steps:

Step 1: dissolving dimyristoylphosphatidylcholine (DMPC), 1,2-dioleoyl-3-trimethylammonium-propane (DOTAP), distearoylphosphatidylethanolamine-polyethylene glycol (DSPE-PEG), a sonosensitizer and an antibiotic in chloroform, and performing rotary evaporation at 50° C. for 5-10 min to form a liposome film;

Step 2: after resuspending the liposome film with ionized water, treating the hydrated liposome with an ultrasonic probe in an ice-water bath, wherein during the treatment process, perfluoropentane (PFP) is slowly added dropwise, and can be gradually wrapped by the liposome in the process of ultrasonic hydration and self-assembly, to form a liposome nanoparticle dispersion; and Step 3: putting the liposome nanoparticle dispersion after reaction in a dialysis bag, and dialyzing in a phosphate buffered saline solution to obtain drug-loaded liposome nanoparticles.

Preferably, the dimyristoylphosphatidylcholine (DMPC), the 1,2-dioleoyl-3-trimethylammonium-propane (DOTAP) and the distearoylphosphatidylethanolamine-polyethylene (DSPE-PEG) in Step 1 are in a mass ratio of 5:1.5:1, and the liposome dissolved in the chloroform is at a final concentration of 10 mg/mL.

Preferably, the sonosensitizer in Step 1 is a drug with sonodynamic properties, such as chlorin, protoporphyrin, photoporphyrin, hematoporphyrin, hematoporphyrin methyl ether, benzochlorin, tetraethyl rhodamine, adriamycin, cisplatin, cyclophosphamide, amphotericin b, 5-fluorouracil, cytarabine, mitomycin c, lomefloxacin, sparfloxacin, gatifloxacin, ciprofloxacin, levofloxacin, methylene blue, toluidine blue, rose red, tetraiodotetrachlorofluorescein derivatives, acridine orange, purpurin, phthalocyanine, naphthocyanine, cyanine, indocyanine green, curcumin, hypocrellin, hypocrellin B, chlorophyll derivatives, hypericin, or berberine.

Preferably, the antibiotic in Step 1 is a nitroimidazole antibiotic such as metronidazole, dimetridazole, ipronidazole, secnidazole, ornidazole, tinidazole, and ronidazole.

Preferably, the solution in Step 1 has a pH value of 7-7.4.

Preferably, in Step 1, the sonosensitizer is at a concentration of 0.5-1 mg/mL, and the antibiotic is at a concentration of 0.5-1 mg/mL.

Preferably, the working conditions of the ultrasonic probe in Step 2 are: working for 5 s, an interval of 2 s, a power of 40%, and ultrasonic time of 5-10 min.

Preferably, the perfluoropentane added dropwise in Step 2 has a volumetric proportion of 1%-2% in the liposome.

Preferably, the dialysis bag used in Step 3 has a molecular weight cutoff of 10 kDa, and the dialysis time is 24-48 h.

Preferably, the phosphate buffered saline solution used in Step 3 has a pH of 7.4 and a concentration of 10 mM.

Preferably, the liposome nanoparticles prepared in the present invention have a size of 150-250 nm.

The above ultrasound-responsive drug-loaded liposome will be used for the treatment of bacterial biofilm infections.

Advantageous Effects of the Present Invention (1) The ultrasound-responsive drug-loaded liposome nanoparticles prepared in the present invention can produce a cavitation effect under the action of ultrasound to destroy the biofilm, release the sonosensitizer and the antibiotic and enhance the permeation of the sonosensitizer and the antibiotic in the biofilm.
(2) Some bacteria are killed through the sonodynamic properties of the sonosensitizer, and the expression of bacterial nitroreductase is improved to activate nitroimidazole drugs to further kill residual stubborn bacteria, thereby achieving potent anti-bacterial biofilm performance.

DETAILED DESCRIPTION OF THE INVENTION

Figure 1:
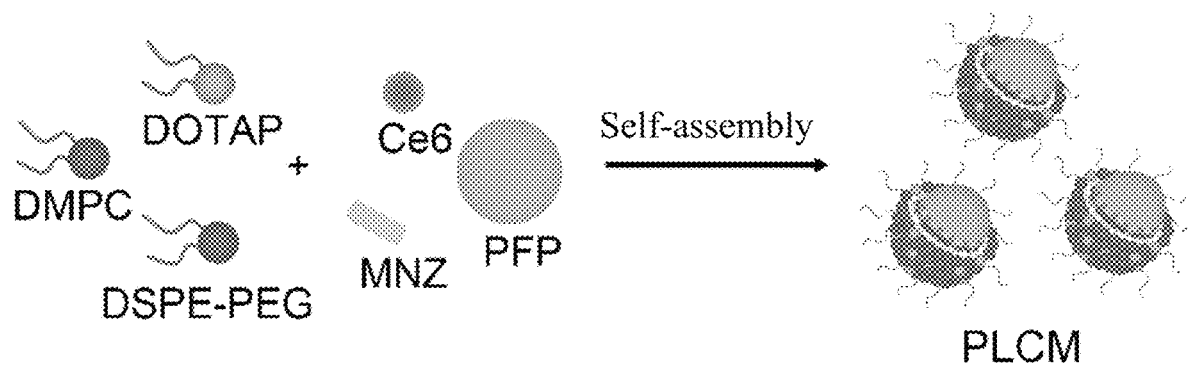
FIG. 1 is a schematic diagram of the preparation of liposome nanoparticles according to the present invention.

The following will disclose the embodiments of the present invention in the drawings. For the sake of clarity, many practical details will be explained in the following description. However, it will be understood that these practical details should not limit the present invention. That is to say, in some embodiments of the present invention, these practical details are not necessary.

The present invention provides ultrasound-responsive liposome nanoparticles. The liposome nanoparticles include a liposome material; the liposome material includes dimyristoylphosphatidylcholine (DMPC), 1,2-dioleoyl-3-trimethyl ammonium-propane (DOTAP), and distearoylphosphatidylethanolamine-polyethylene glycol (DSPE-PEG); and the liposome nanoparticles also include a sonosensitizer, an antibiotic and perfluoropentane (PFP).

The preparation method of the present invention is explained below using chlorin as the sonosensitizer and metronidazole as the antibiotic.

The preparation method of the present invention is as follows:

S1. Dimyristoylphosphatidylcholine (DMPC), 1,2-dioleoyl-3-trimethylammonium-propane (DOTAP) and distearoylphosphatidylethanolamine-polyethylene glycol (DSPE-PEG) were dissolved in chloroform at a mass ratio of 5:1.5:1, so that the liposome concentration in the final solution was 10 mg/mL.

S2. The sonosensitizer chlorin (Ce6) and the antibiotic metronidazole (MNZ) were further added to the liposome solution, wherein the chlorin and metronidazole were at a concentration of 0.5-1 mg/mL in the liposome solution; and finally, rotary evaporation was performed at 50° C. for 5-10 min to obtain a drug-containing liposome film.

S3. After deionized water was added to resuspend the liposome film, ultrasound treatment was performed for 5-10 min using an ultrasonic cell disrupter in an ice-water bath, under the working conditions: working for 5 s, an interval of 2 s and a power of 40%. During the ultrasound treatment, perfluoropentane (PFP) was added dropwise to a volumetric proportion of 1.5% in the final solution, to obtain a liposome nanoparticle dispersion.

S4. The liposome nanoparticle dispersion after reaction was dialyzed for 24-48 h in a phosphate buffer with a pH of 7.4 and a concentration of 10 mM in a dialysis bag with a molecular weight cutoff of 10 kDa, to obtain liposome nanoparticles PLCM wrapping PFP and loaded with Ce6 and MNZ.

The morphology of PLCM was observed using a transmission electron microscope. The particle size distribution of PLCM in a deionized water solution was observed using a dynamic light scattering particle size analyzer. The freeze-dried PLCM was mixed with potassium bromide powder and ground together, a mass ratio of the sample to the potassium bromide powder being 1:100; and the ground mixture was pressed into tablets and placed in an infrared spectrometer for detection to prove the successful loading of the drug.

Figure 2:
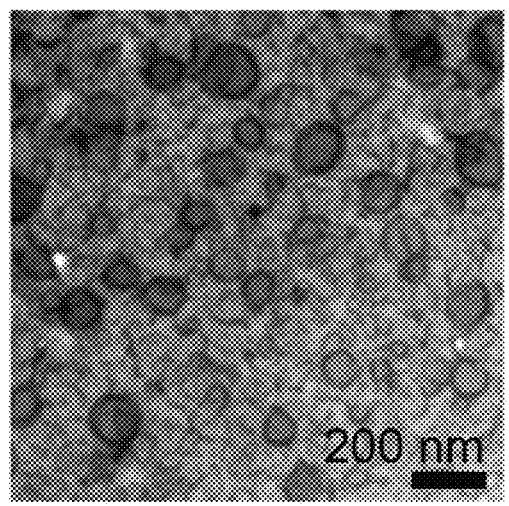
FIG. 2 is a transmission electron microscopy image of liposome nanoparticles according to the present invention.
Figure 3:
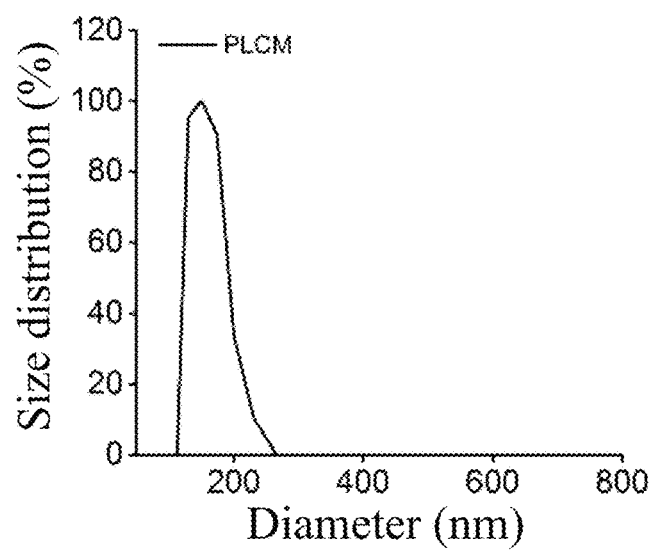
FIG. 3 is a graph showing particle size distribution of liposome nanoparticles according to the present invention.
Figure 4:
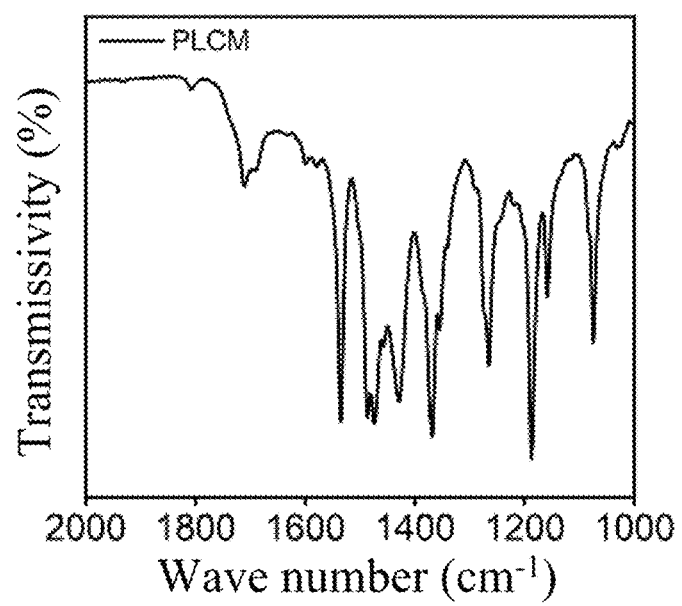
FIG. 4 is a Fourier infrared spectrogram of liposome nanoparticles according to the present invention.

FIG. 1 is a schematic diagram of the synthesis process of PLCM. As can be seen from FIG. 2 and FIG. 3, PLCM is spherical nanoparticles with a size distribution of 150-250 nm. It can be observed from FIG. 4 that the infrared spectrogram of PLCM has a bending vibration peak of the N—H bond of Ce6 at 1,590 $cm^{-1}$ and a stretching vibration peak of the N=O bond of MNZ at 1,485 $cm^{-1}$, which proves the successful loading of Ce6 and MNZ on the liposome.

A *Pseudomonas aeruginosa* biofilm is used as an example below to verify that the PLCM of the present invention can destroy the biofilm and enhance the permeation of the sonosensitizer and the antibiotic in the biofilm through an ultrasonic cavitation effect under the action of ultrasound, to achieve potent anti-bacterial biofilm performance.

1. The Ultrasonic Cavitation Effect of the Drug-Loaded Liposome Destroys the Biofilm Structure and Enhances Drug Permeation (1) Culture of *Pseudomonas aeruginosa* Biofilm A single colony of wild-type *Pseudomonas aeruginosa* (PAO1) was scraped into 5 mL of Luria-Bertani (LB) medium, and incubated and grown on a constant temperature shaker at 37° C. for 10-12 h, with a rotation speed of 220 rpm, to obtain a PAO1 suspension in a logarithmic phase. The PAO1 suspension was washed three times with normal saline (0.85% NaCl solution), with centrifugation conditions: 12,000 rpm for 3 min; and a microplate reader was used for quantification, wherein, when $OD_{600}$=0.1, the bacterial solution had a concentration of $1\times10^8$ CFU/mL. The washed bacterial solution was diluted to $1\times10^6$ CFU/mL with Tryptic Soy Broth (TSB), added into a 96-well plate and incubated in a 37° C. incubator for 24 h to obtain a PAO1 biofilm.

(2) Evaluation of the Damage Effect of the Ultrasound-Responsive Drug-Loaded Liposome on the Biofilm The supernatant was removed from the PAO1 biofilm grown well in the 96-well plate, 200 μL of a phosphate buffer and a PLCM dispersion were added into each well, and the 96-well plate was placed in a 37° C. incubator. In the ultrasound treatment group, ultrasound treatment was performed for 10 min using 1 MHz ultrasound at a power of 1 W/cm². After incubation for 6 h, the biofilm supernatant was taken out and fixed using formalin for 10 min; then the formalin was absorbed away, 100 μL of 0.2% crystal violet staining solution was added into each well; and after 30 min of staining, each well was washed three times with normal saline, and then the 96-well plate was observed and photographed under an inverted microscope, with the imaging results shown in FIG. 5. After observation, 200 μL of ethanol was added into each well to dissolve the crystal violet; and after decolorization for 3 h, the absorbance of each well at 590 nm was measured using a microplate reader, and the biofilm biomass was calculated, with the results shown in FIG. 6.

Figure 7:
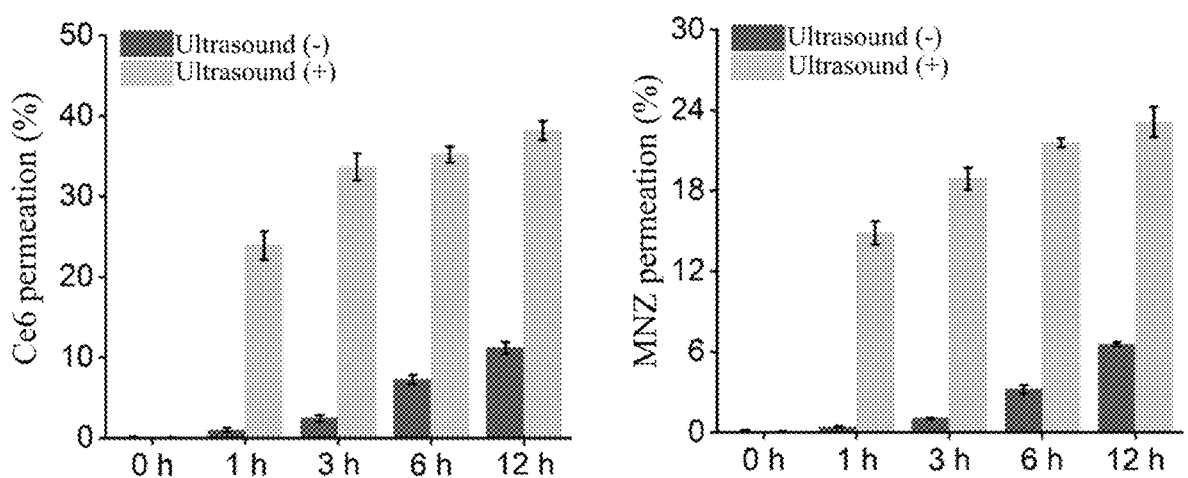
FIG. 7 shows the enhancement of drug permeation in the biofilm by the drug-loaded liposome under the action of ultrasound according to the present invention.

(3) Evaluation of the Promotion of the Ultrasound-Responsive Drug-Loaded Liposome on Drug Permeation in the Biofilm The PAO1 biofilm was grown inside a 6-well Transwell chamber with a pore diameter of 2 μm, and a PLCM dispersion was added into the chamber. In the ultrasound treatment group, ultrasound treatment was performed for 10 min using 1 MHz ultrasound at a power of 1 W/cm². After incubation for 1 h, 3 h, 6 h, and 12 h, the solution in the Transwell lower chamber was collected, and the contents of Ce6 and MNZ were analyzed through UV-visible absorption spectroscopy, with the results shown in FIG. 7.

Figure 5:
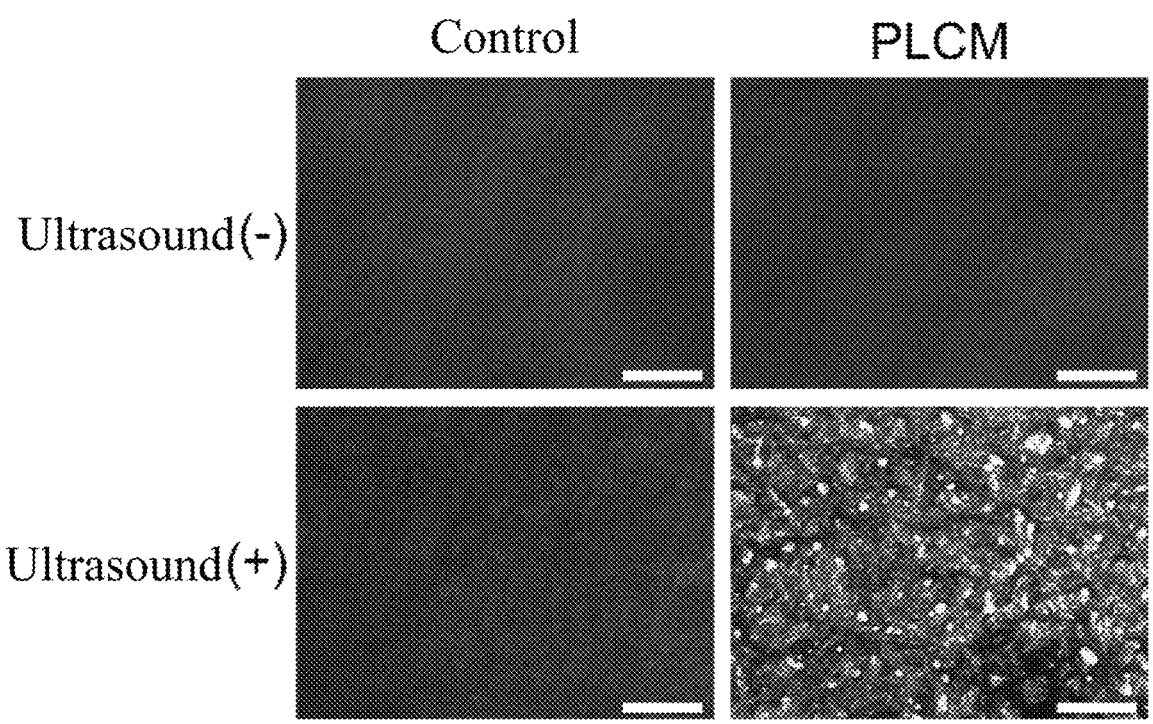
FIG. 5 is a picture showing crystal violet staining for verifying the damage of the biofilm structure by the drug-loaded liposome nanoparticles under the action of ultrasound according to the present invention.
Figure 6:
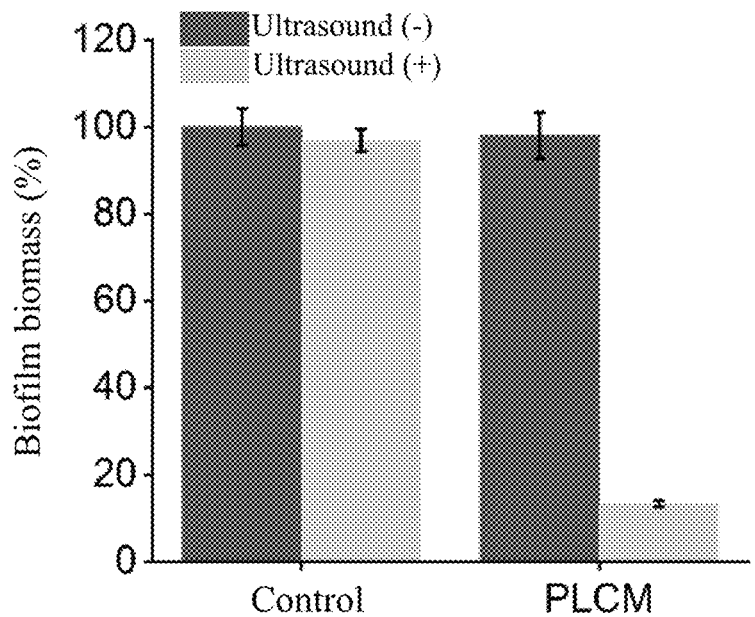
FIG. 6 shows the biomass for verifying the damage of the biofilm by the drug-loaded liposome under the action of ultrasound according to the present invention.

It can be seen from the results in FIG. 5 and FIG. 6 that the cavitation effect produced by PLCM under the action of ultrasound makes obvious holes inside the PAO1 biofilm and significantly reduces the biomass of the PAO1 biofilm. In addition, the results in FIG. 7 also show that after the treatment with PLCM and ultrasound, the amount of Ce6 and MNZ permeating through the biofilm is also significantly increased, which proves that PLCM plus ultrasound can destroy the biofilm and enhance the drug permeation within the biofilm.

Figure 8:
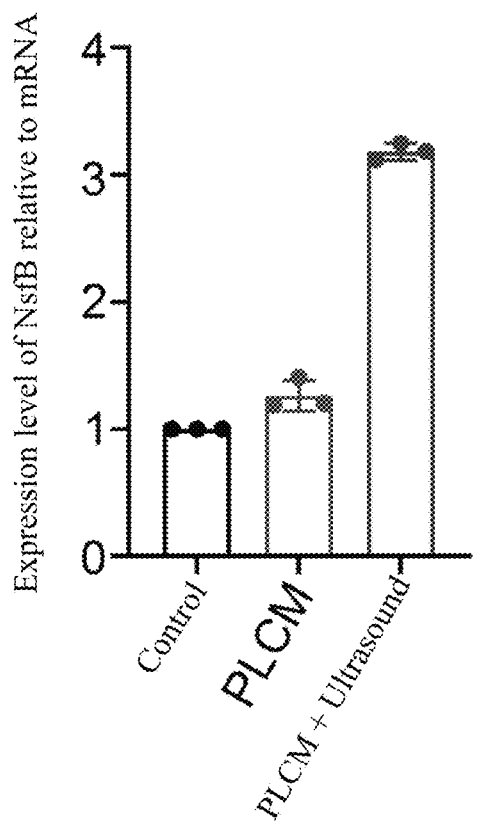
FIG. 8 shows the expression of nitroreductase-related genes in *Pseudomonas aeruginosa* biofilm enhanced by the drug-loaded liposome under the action of ultrasound according to the present invention.

2. Effect of Ultrasound-Responsive Drug-Loaded Catalytic Microbubbles in Eliminating the Biofilm (1) Determination of the Expression of Nitroreductase-Related Genes A PAO1 biofilm was grown in a 6-well plate, and a phosphate buffer and PLCM were added respectively. In the ultrasound treatment group, ultrasound treatment was performed for 10 min using 1 MHz ultrasound at a power of 1 W/cm² before incubation for 24 h. The RNA of the bacteria inside the PAO1 biofilm was extracted with a bacterial RNA extraction kit, and further subjected to reverse transcription using a reverse transcription kit to synthesize DNA complementary to the bacterial RNA; and finally, the expression level of the nitroreductase-related genes (NsfB) of the bacteria was determined using a real-time fluorescent quantitative PCR instrument, with Proc gene as a reference gene. The experimental results are shown in FIG. 8.

Figure 9:
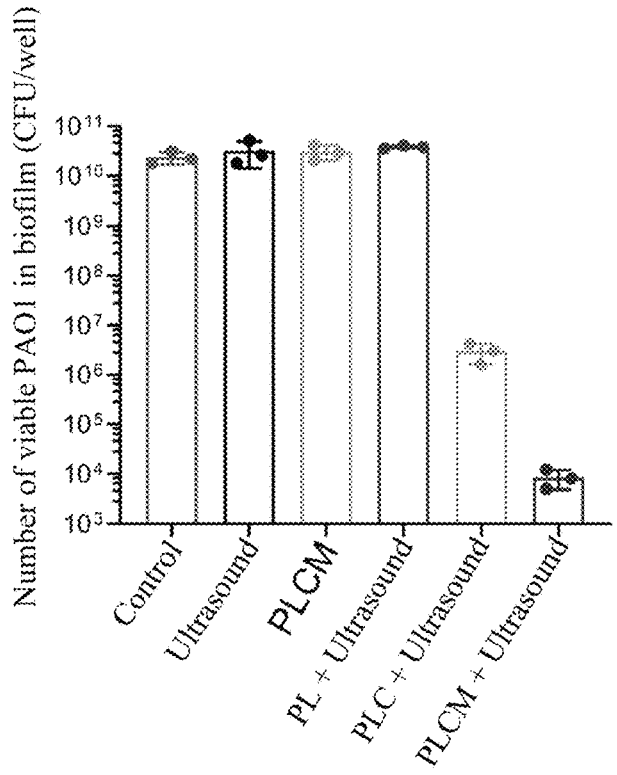
FIG. 9 shows the data statistics of plate counting for demonstrating the anti-biofilm properties of the drug-loaded liposome according to the present invention.
Figure 10:
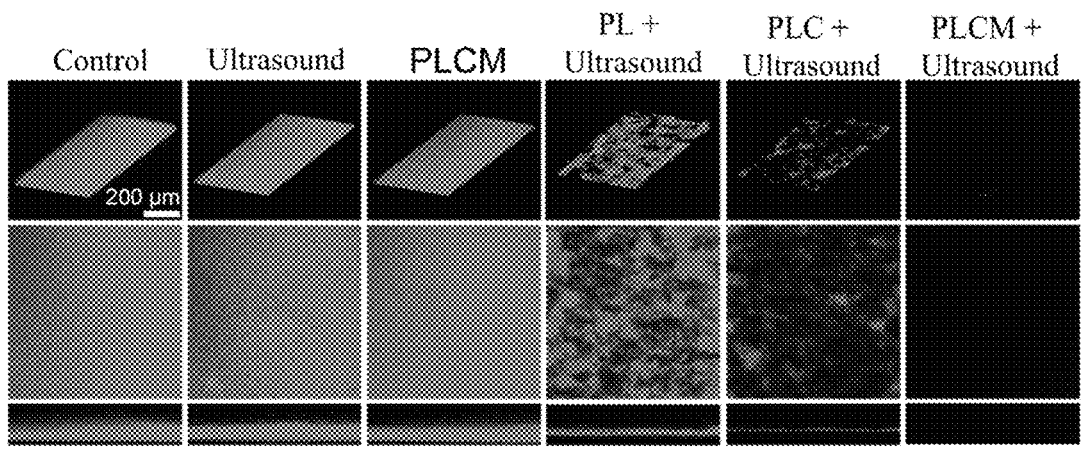
FIG. 10 is a confocal fluorescence microscopy image demonstrating the anti-biofilm properties of the drug-loaded liposome according to the present invention.

(2) Evaluation of the Inhibitory Effect of the Ultrasound-Responsive Drug-Loaded Liposome on the Biofilm PAO1 biofilms were grown in a confocal culture dish and a 96-well plate, and a PFP-loaded liposome (PL), PFP- and Ce6-loaded liposomes (PCL), and PFP-, Ce6- and MNZ-loaded liposomes (PLCM) were added respectively. In the ultrasound treatment group, ultrasound treatment was performed for 10 min using 1 MHz ultrasound at a power of 1 W/cm² before culturing for 12 h in a 37° C. incubator. The biofilm in the 96-well plate was dispersed and then transferred to a 1.5 mL centrifugal tube in which the volume was made up to 1 mL using normal saline; the obtained solution was subjected to gradient dilution by 10, $10^2$, $10^3$, $10^4$, $10^5$ and $10^6$ times respectively; and then 100 μL of the stock solution and the bacterial solution diluted by $10^4$, $10^5$ and $10^6$ times were added to a culture dish containing a solid LB medium for plate counting and quantification. The experimental results are shown in FIG. 9. After the biofilm in the confocal culture dish was stained with Calcien-AM for half an hour, the viable bacteria in the biofilm were observed through confocal fluorescence microscopy imaging. The experimental results are shown in FIG. 10.

The highly expressed nitroreductase of *Pseudomonas aeruginosa* in hypoxic state can activate nitroimidazole drugs to produce imidazole fragments to kill bacteria. Ce6 produces sonodynamic properties under the action of ultrasound to convert oxygen into active oxygen which kills active bacteria on the surface of the biofilm, aggravates the hypoxic state deep in the biofilm and enhances the expression of bacterial nitroreductase, thereby further activating metronidazole and killing low-activity bacteria deep in the biofilm. As shown in FIG. 8, after PLCM plus ultrasound treatment, the expression of the nitroreductase-related genes (NsfB) of *Pseudomonas aeruginosa* is notably higher than that in the PLCM treatment group and the control, which proves that the oxygen consumption caused by the sonodynamic treatment of PLCM can significantly enhance the expression of the nitroreductase of *Pseudomonas aeruginosa*. As shown in FIG. 9 and FIG. 10, the amount of bacteria inside the *Pseudomonas aeruginosa* biofilm in the PLCM treatment group and the PL plus ultrasound treatment group shows no obvious change compared with the control, while the bacteria in the PLC plus ultrasound treatment group are decreased by 4.1 orders of magnitude relative to the control, which proves that the sonodynamic properties of PLC have a significant antibacterial effect. The bacteria in the PLCM plus ultrasound treatment group were decreased by 5.9 orders of magnitude relative to the control, which proves that the sonodynamically activated MNZ can further inhibit the bacteria inside the biofilm.

Figure 11:
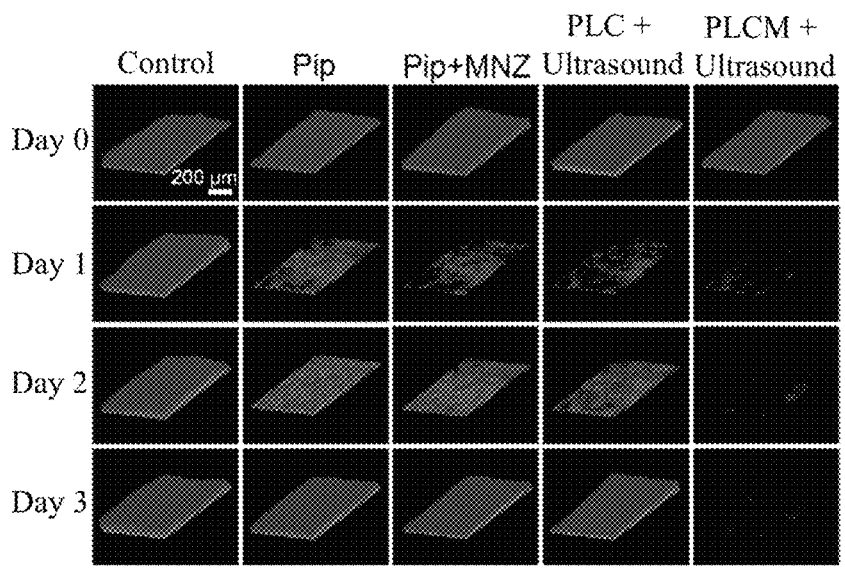
FIG. 11 is a confocal fluorescence microscopy image demonstrating the elimination of the biofilm and then inhibition of biofilm regrowth by the drug-loaded liposome according to the present invention.

3. Ultrasound-Responsive Drug-Loaded Catalytic Microbubbles Inhibit Biofilm Regrowth PAO1 biofilms were grown in a confocal culture dish and a 96-well plate, and an antibiotic piperacillin (Pip), a mixture of Pip and MNZ, PCL, and PLCM dispersed in TSB were added respectively. In the ultrasound treatment group, ultrasound treatment was performed for 10 min using 1 MHz ultrasound at a power of 1 W/cm$^2$ before culturing in a 37° C. incubator. After incubation for 1 d, 2 d, and 3 d, the biofilm in the confocal culture dish was stained with Calcien-AM for half an hour, and viable bacteria in the biofilm were observed through confocal fluorescence microscopy imaging. The experimental results are shown in FIG. 11. After incubation for 1 d, 2 d, and 3 d, the biofilm in the 96-well plate was dispersed and then transferred to a 1.5 mL centrifugal tube in which the volume was made up to 1 mL using normal saline; the obtained solution was subjected to gradient dilution by 10, 10$^2$, 10$^3$, 10$^4$, 10$^5$ and 10$^6$ times respectively; and then 100 μL of the stock solution and the bacterial solution diluted by 10$^4$, 10$^5$ and 10$^6$ times were added to a culture dish containing a solid LB medium for plate counting and quantification. The experimental results are shown in FIG. 12.

Figure 12:
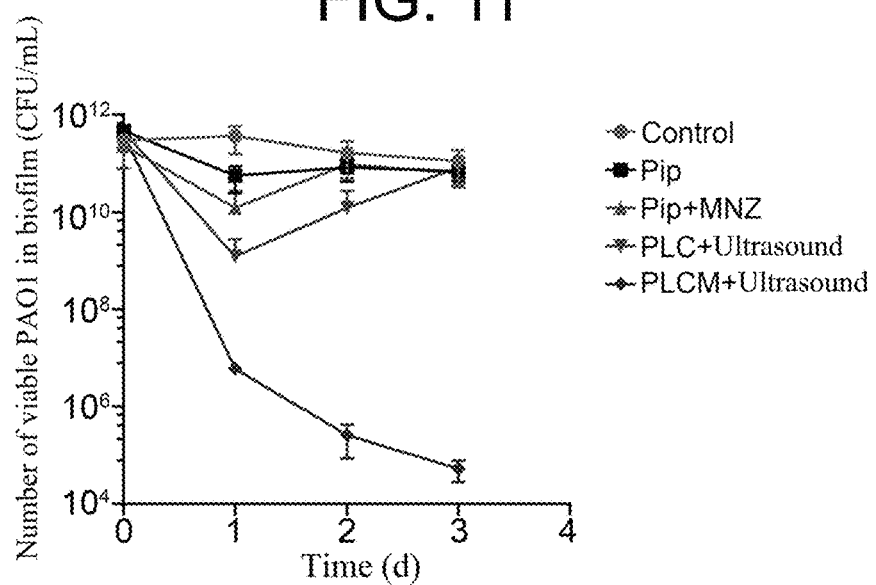
FIG. 12 shows the data statistics of plate counting for demonstrating the elimination of the biofilm and then inhibition of biofilm regrowth by the drug-loaded liposome according to the present invention.

As shown in FIGS. 11-12, the amount of bacteria in the biofilm of the PLCM plus ultrasound treatment group is gradually decreased, and there is no phenomenon of re-growth, while the biofilms of other treatment groups all show an obvious rise in the number of bacteria as well as a phenomenon of re-growth, which proves that the ultrasound-responsive drug-loaded liposome (PLCM) can efficiently kill bacteria inside the biofilm while inhibiting the regrowth of the biofilm.

The above research results prove that PLCM can destroy the *Pseudomonas aeruginosa* biofilm structure and enhance the permeation of the sonosensitizer Ce6 and the antibiotic MNZ inside the biofilm through an ultrasonic cavitation effect under the action of ultrasound. The sonodynamic properties of Ce6 can efficiently kill metabolically active bacteria in the biofilm, aggravate the hypoxic microenvironment in the biofilm, enhance the expression of bacterial nitroreductase genes, activate the antibiotic MNZ, and kill the bacteria with low metabolic activity in the biofilm, so as to achieve efficient inhibition of the *Pseudomonas aeruginosa* biofilm and inhibit the re-growth of the *Pseudomonas aeruginosa* biofilm; and moreover, the treatment effect is significantly better than that of traditional antibiotic Pip for treating *Pseudomonas aeruginosa* infections.

The above descriptions are only embodiments of the present invention and are not intended to limit the present invention. For those skilled in the art, various modifications and variations may occur to the present invention. Any modification, equivalent replacement, improvement and the like made within the spirit and principle of the present invention shall fall within the scope of the claims of the present invention.

What is claimed is:

1. Ultrasound-responsive liposome nanoparticles, comprising:
    a lipid material, comprising dimyristoylphosphatidylcholine, 1,2-dioleoyl-3-trimethylammonium-propane and distearoylphosphatidylethanolamine-polyethylene glycol;
    a sonosensitizer;
    an antibiotic; and
    perfluoropentane.

2. The ultrasound-responsive liposome nanoparticles according to claim 1, wherein the perfluoropentane has a volumetric proportion of 1%-2% in the ultrasound-responsive liposome nanoparticles.

3. The ultrasound-responsive liposome nanoparticles according to claim 1, wherein the sonosensitizer is at a concentration of 0.5-1 mg/mL in the ultrasound-responsive liposome nanoparticles.

4. The ultrasound-responsive liposome nanoparticles according to claim 3, wherein the sonosensitizer is chlorin.

5. The ultrasound-responsive liposome nanoparticles according to claim 1, wherein the antibiotic is at a concentration of 0.5-1 mg/mL in the ultrasound-responsive liposome nanoparticles.

6. The ultrasound-responsive liposome nanoparticles according to claim 5, wherein the antibiotic is metronidazole.

7. The ultrasound-responsive liposome nanoparticles according to claim 1, wherein the dimyristoylphosphatidylcholine, the 1,2-dioleoyl-3-trimethylammonium-propane and the distearoylphosphatidylethanolamine-polyethylene glycol are in a mass ratio of 5:1.5:1.

8. A method of preparing the ultrasound-responsive liposome nanoparticles according to claim 1, comprising the following steps:
    Step 1: dissolving the dimyristoylphosphatidylcholine, the 1,2-dioleoyl-3-trimethylammonium-propane, the distearoylphosphatidylethanolamine-polyethylene glycol, the sonosensitizer and the antibiotic in chloroform, and performing rotary evaporation at 50° C. for 5-10 min to form a liposome film;
    Step 2: after resuspending the liposome film with ionized water, treating hydrated liposome with an ultrasonic probe in an ice-water bath, wherein during treatment process, the perfluoropentane is slowly added dropwise, and can be gradually wrapped by the hydrated liposome in a process of ultrasonic hydration and self-assembly, to form a liposome nanoparticle dispersion; and
    Step 3: putting the liposome nanoparticle dispersion after reaction in a dialysis bag, and dialyzing in a phosphate buffered saline solution to obtain drug-loaded liposome nanoparticles.

9. The method of preparing the ultrasound-responsive liposome nanoparticles according to claim 8, wherein working conditions of the ultrasonic probe in Step 2 are: working for 5 s, an interval of 2 s, a power of 40%, and ultrasonic time of 5-10 min.

10. The method of preparing the ultrasound-responsive liposome nanoparticles according to claim 8, wherein the dialysis bag used in Step 3 has a molecular weight cutoff of 10 kDa, and dialysis time is 24-48 h.

11. The method of preparing the ultrasound-responsive liposome nanoparticles according to claim 8, wherein the phosphate buffered saline solution used in dialysis in Step 3 has a pH of 7.4 and a concentration of 10 mM.

12. The method of preparing the ultrasound-responsive liposome nanoparticles according to claim 8, wherein the drug-loaded liposome nanoparticles in Step 3 are the ultrasound-responsive liposome nanoparticles and have a size of 150-250 nm.

13. A method of using the ultrasound-responsive liposome nanoparticles of claim 1 in a treatment of bacterial biofilm infections, comprising:
    preparing a bacterial biofilm;
    adding a dispersion comprising the ultrasound-responsive liposome nanoparticles of claim 1 into the bacterial biofilm; and then
    applying an ultrasound treatment to the bacterial biofilm having the dispersion.

* * * * *